United States Patent
Ko

(10) Patent No.: US 7,830,910 B2
(45) Date of Patent: Nov. 9, 2010

(54) SYSTEM FOR PROVIDING INTERACTIVE BROADCAST SERVICE AND METHOD THEREOF

(75) Inventor: Kwang O. Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 416 days.

(21) Appl. No.: 11/468,718

(22) Filed: Aug. 30, 2006

(65) Prior Publication Data

US 2007/0060042 A1 Mar. 15, 2007

(30) Foreign Application Priority Data

Aug. 30, 2005 (KR) .................... 10-2005-0080263

(51) Int. Cl.
*H04J 3/00* (2006.01)
(52) U.S. Cl. ........................................ 370/466
(58) Field of Classification Search .................. 370/392, 370/400, 401, 466, 467, 469
See application file for complete search history.

(56) References Cited

U.S. PATENT DOCUMENTS

| 6,058,169 | A * | 5/2000 | Bramnick et al. | 379/100.01 |
|---|---|---|---|---|
| 6,557,031 | B1 * | 4/2003 | Mimura et al. | 709/218 |
| 7,594,027 | B1 * | 9/2009 | Cook | 709/241 |
| 2003/0045290 | A1 | 3/2003 | Tuohimetsa et al. | |
| 2004/0187021 | A1 * | 9/2004 | Rasanen | 713/200 |
| 2005/0021833 | A1 * | 1/2005 | Hundscheid et al. | 709/236 |
| 2006/0184989 | A1 * | 8/2006 | Slothouber | 725/110 |

FOREIGN PATENT DOCUMENTS

| KR | 10-2004-0088791 | 10/2004 |
|---|---|---|
| KR | 10-2006-0071067 | 6/2006 |

* cited by examiner

*Primary Examiner*—Chirag G Shah
*Assistant Examiner*—Amarnauth Persaud
(74) *Attorney, Agent, or Firm*—Lee, Hong, Degerman, Kang & Waimey

(57) ABSTRACT

A system for providing an interactive broadcast service and method thereof are disclosed, by which a communication service and an interactive broadcast service can be unitedly supported in an IMS (Internet protocol Multimedia Subsystem) environment. The present invention includes a first server receiving a message of the protocol from the UE and making a registration for a service subscription for the UE from subscription-related information included in the message, a first media server receiving a multimedia stream of the broadcast service to be transmitted to the registered UE from a corresponding broadcasting network, and a second media server connected to the broadcasting network, converting interaction data inserted in the message of the protocol received from the UE to a signal format supported by the broadcasting network.

14 Claims, 2 Drawing Sheets

SYSTEM FOR PROVIDING INTERACTIVE BROADCAST SERVICE AND METHOD THEREOF

CROSS-REFERENCE TO RELATED APPLICATION

This application claims the benefit of the Korean Patent Application No. 10-2005-0080263, filed on Aug. 30, 2005, which is hereby incorporated by reference as if fully set forth herein.

BACKGROUND OF THE INVENTION

1. Field of the Invention

The present invention relates to a service convergence between a communication network and a broadcasting network, and more particularly, to a system for providing an interactive broadcast service and method thereof. Although the present invention is suitable for a wide scope of applications, it is particularly suitable for providing the interactive service using an internet protocol multimedia subsystem.

2. Discussion of the Related Art

Recently, a system for providing all services based on Internet Protocol (IP) has been proposed as a next generation network system. In particular IP Multimedia Subsystem (IMS) has been proposed.

The IMS supports a convergence in wire/wireless services. In particular, the IMS unifies a voice service and a data service into one to provide to a communication terminal.

So, the IMS is a network platform that can provide multimedia as well as a voice communication.

The IMS employs IP or Session Initiation Protocol (SIP).

Meanwhile, it is expected that a broadcast service and a communication service will converge into one in the future.

However, IMS has not considered providing a network function for a broadcast service at all. So, it is needed to establish an IMS environment that aims at AIPN (All IP Network) for the convergence between the broadcast service and the communication service.

SUMMARY OF THE INVENTION

Accordingly, the present invention is directed to a system for providing an interactive broadcast service and method thereof that substantially obviate one or more problems due to limitations and disadvantages of the related art.

An object of the present invention is to provide a system for providing an interactive broadcast service and method thereof, by which the interactive broadcast service can be appropriately supported in an IMS environment.

Another object of the present invention is to provide a system for providing an interactive broadcast service and method thereof, by which a communication service and a broadcast service can be unitedly supported in an IMS environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing a broadcasting service via a multimedia subsystem, in which the multimedia subsystem provides a communication service based on an IP (internet protocol), according to the present invention includes the steps of registering a UE (user equipment) to the multimedia subsystem using a protocol for controlling signaling of a communication session based on the IP, converting a multimedia stream received from a broadcasting network providing the broadcast service to a signal corresponding to performance of the UE, converting interaction data received from the UE to a signal format supported by the broadcasting network or converting interaction data received from the broadcasting network to a signal format supported by the UE while the converted signal is transmitted to the UE, and relaying the converted data between the UE and the broadcasting network.

Preferably, for a registration to the multimedia subsystem, the UE transmits a message defined by the protocol for controlling the signaling of the communication session to the multimedia subsystem by inserting subscription-related information of the UE into a portion of the message.

More preferably, the portion of the message into which the subscription-related information is inserted depends on an SDP (Session Description Protocol) representing features of the communication session.

More preferably, the subscription-related information includes identification information of the UE, performance and specification information of the UE, current position information of the UE, information associated with authentication or service approval of the UE and routing information of the UE.

Preferably, the interaction data of the UE is received by being inserted into a part depending on an SDP (Session Description Protocol) representing features of the communication session in the message defined by the protocol for controlling the signaling of the communication session.

Preferably, a result of the conversion to the signal format supported by the UE is transmitted to the UE by being inserted into a part depending on an SDP (Session Description Protocol) representing features of the communication session in the message defined by the protocol for controlling the signaling of the communication session.

In another aspect of the present invention, in providing a broadcast service to a UE (User Equipment) supporting a protocol for signaling of a communication session based on an IP (Internet Protocol), a system for providing the broadcast service includes a first server receiving a message of the protocol from the UE, the first server making a registration for a service subscription for the UE by using subscription-related information included in the message, a first media server receiving a multimedia stream of the broadcast service to be transmitted to the registered UE from a corresponding broadcasting network, the first media server converting the received multimedia stream to a format corresponding to performance and specification of the UE, the first media server providing the converted multimedia to the UE, and a second media server connected to the broadcasting network, the second media server converting interaction data inserted in the message of the protocol received from the UE to a signal format supported by the broadcasting network, the second media server transmitting the converted interaction data to the broadcasting network, the second media server converting interaction data received from the broadcasting network to a signal format supported by the UE, the second media server transmitting the message of the protocol to the UE by inserting the converted interaction data into the message of the protocol.

Preferably, the system is an IMS (IP multimedia subsystem) providing a communication service based on the IP (internet protocol).

Preferably, the first server includes a home subscriber server (HSS) registering the subscription-related information including identification information of the UE, performance and specification information of the UE, current position information of the UE, information associated with authentication or service approval of the UE and routing information of the UE to a database.

Preferably, the first media server includes a multimedia resource function controller (MRFC) provided with a transcoder converting the multimedia stream.

Preferably, the second media server includes a multimedia resource function processor (MRFP) provided with an entity converting the interaction data.

Preferably, the first media server controls the second media server with an H.248 interface.

Preferably, the first media server is provided with information for the performance and specification of the UE from the subscription-related information of the UE subscribed to the first server.

Preferably, the protocol for controlling the signaling of the communication session based on the IP (internet protocol) is a session initiation protocol.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, the present invention transmits all broadcast data and multimedia using a signal interface.

Figure 1:
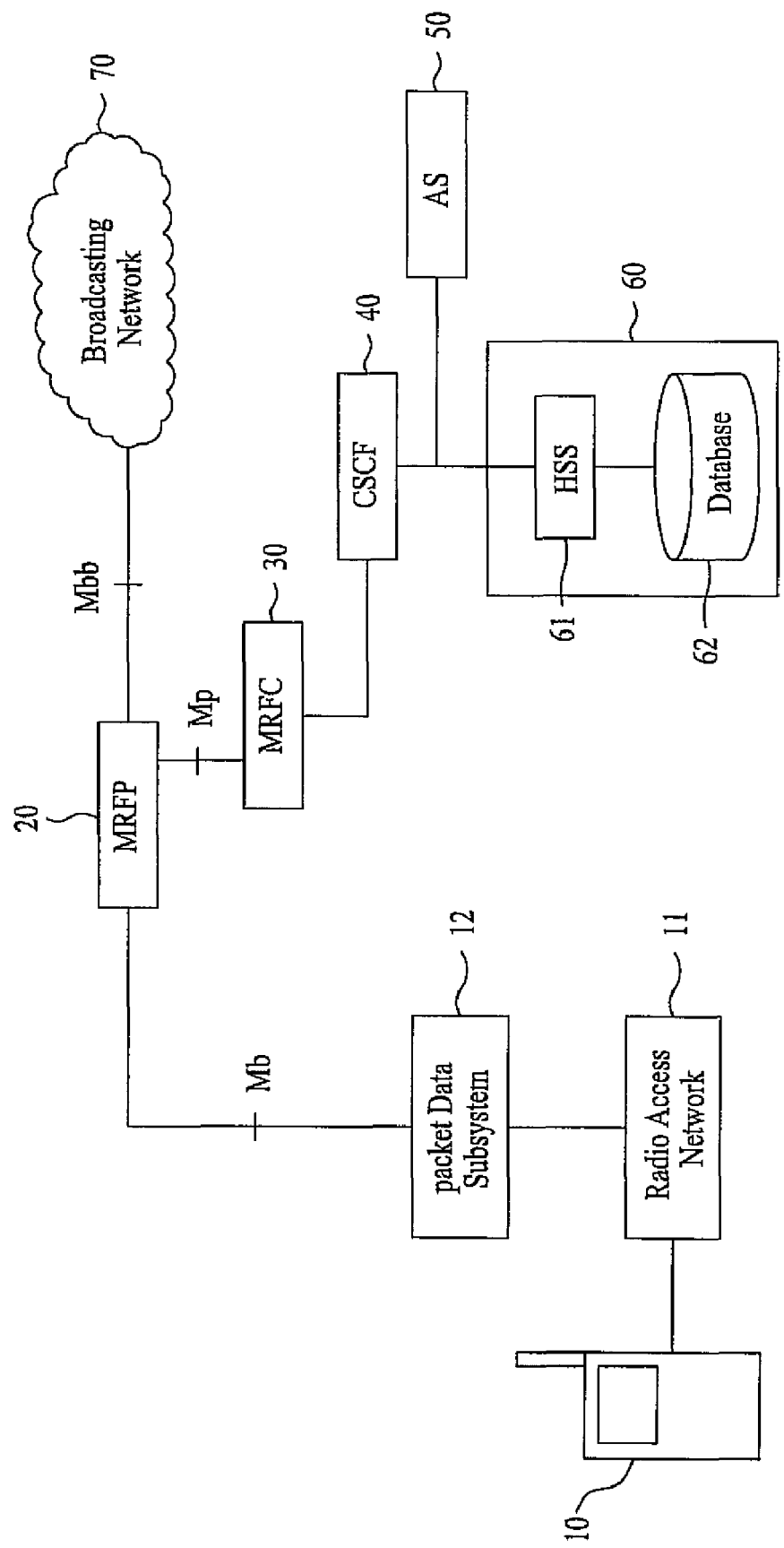
FIG. 1 is a block diagram of an interactive broadcast service system of a mobile communication terminal using IMS according to the present invention.

FIG. 1 is a block diagram of an interactive broadcast service system of a mobile communication terminal using IMS according to the present invention, in which a configuration of a system supporting an interactive broadcast service for a communication terminal (UE: user equipment) 10 via IMS is shown.

Referring to FIG. 1, a system according to the present invention includes a user database unit 60, a call/session control unit for a UE 10, an application server 50, a plurality of media servers 20 and 30 and a plurality of access networks 11 and 12 for the UE 10 to be connected to an IMS using IP.

The UE 10 supports SIP (session initiation protocol).

And, the UE 10 subscribes in various services. In this case, the services are provided by the AS 50 and the call/session control unit interoperating with each other. In the following description, it is assumed that the UE 10 bas subscribed in an interactive broadcast service.

The user database unit 60 includes a home subscriber server (HSS) 61 and a database 62.

Subscription-related information according to the broadcast service subscription of the UE 10, i.e., user profiles are registered and managed by the HSS 61.

The subscription-related information includes identification information of the UE 10, performance and specification information of the UE 10 and current position information of the UE 10 and further includes information associated with user's authentication or service approval and routing information. In particular, the subscription-related information includes all kinds of registration status information to confirm whether a service provision according to a service subscription corresponds to a user in a valid status and to update the information registered for the service subscription in some cases.

So, the HSS 60 includes the subscription-related information to support system elements relating to a substantial call or session control.

The call/session control unit for a UE 10 corresponds to an IP-based IMS and includes a call state control function (CSCF) server 40. In this case, the CSCF server 40 is an SIP server that employs various roles of an SIP to handle SIP signaling packets in the IMS. In particular, the CSCF 40 of the present invention is a serving CSCF (S-CSCF).

The CSCF 40 handles SIP registration. In this case, the SIP registration is a processing for searching for a current position of the UE and an SIP address. And, an SIP message including the subscription-related information is used for the SIP registration. The SIP address has an address system similar to that of e-mails. For instance, the SIP address may correspond to SIP-URI (SIP uniform resource identifier) that is an alphanumeric identifier. By the SIP address, entities configuring a network can be identified from each other. And, the UE 10 accesses the IMS by registering the SIP address.

The CSCF 40 comes into interfacing to the HSS 61 to upload and download the user profiles. In particular, the CSCF 40 handles the SIP registration for the UE 10 by interconnecting to the HSS 61 in case of receiving the SIP message including the subscription-related information.

The media servers 20 and 30 are media resource function (MRF) nodes providing media resources within a network, and includes a multimedia resource function processor (MRFP) 20 and a multimedia resource function controller (MRFC) 30. In particular, the MRFP 20 is connected to a broadcasting network.

The MRFC 30 is a signaling plane node operating as an SIP user agent for the CSCF 40 and controls the MRFP 20. For instance, the MRFC 30 controls the MRFP with H.248 interface. In particular, the MRFC 30 controls multimedia stream resources under the control of the MRFP 20.

The MRFC 30 is provided with a transcoder converting a data source, which is to be delivered to the UE 10 from the broadcasting network 70, to fit performance and specification of the UE 10. And, the MRFC 30 is responsible for an interface role in interconnecting the system according to the present invention to the broadcasting network 70 together via the transcoder.

In particular, the MRFC 30 refers to the subscription-related information in converting the data source. So, the MRFC 30 downloads the subscription-related information of the UE 10 from the HSS 60 via the CSCF 40.

And, the MRFC 30 transmits information for fringe areas, where reception is poor, of broadcast services according to various areas to the HSS 70.

The MRFP 20 is a media plane node performing functions associated with all media. The MRFP 20 of the present invention is provided with PUID (parser for interaction data) entity.

The PUID entity, which is provided to support an interactive broadcast service, converts user interaction data (UID) delivered from the UE 10 to a signal format supported by the broadcasting network 70 and then transmits a result of the conversion to the broadcasting network 70.

The PUID entity converts User Interaction Data (UID) delivered from the broadcasting network 70 to a signal format supported by the UE 10 and then transmits a result of the conversion to the UE 10. In this case, the UID delivered from the broadcasting network 70 is the data corresponding to supplementary information except multimedia streams.

The PUID entity decides where the UID will be forwarded by referring to a service profile. In particular, the PUID entity decides a routing to deliver the UID.

For instance, the MRFC 30 may control a signal format conversion in the MRFP 20 based on the provided subscription-related information.

In the above description, the user interaction data (UID) is transmitted/received between the UE 10 and the PUID entity via SDP (session description protocol) of the SID message.

In the present invention, SDP is used for the interactive broadcast service together with SIP.

The SIP interoperates with other protocols to control a signaling of a communication session (e.g. generation, modification and termination of various real-time multimedia sessions). The SIP operates as a deliver for SDP representing features of a communication session for multimedia. So, in the present invention, the SIP message includes an SDP part and transmits the SIP message by inserting subscription-related information necessary for a service subscription or registration or UID into the SDP part.

The application server (AS) 50 to interfaces to the CSCF 40 that employs SIP and provides various services including a broadcast service. In particular, the AS of the present invention is an SIP-AS. So, the IMS according to the present invention is able to substantially include the CSCF server 40 and the AS 50.

In case of receiving the SIP message, the AS 50 updates information of the user database unit 60 with latest subscription-related information included in the SIP message.

And, an access network is a radio access network (RAN) interoperating within a packet data subsystem (PDS) 12 that supports radio packet data transmission.

Operation in supporting an interactive broadcast service according to the above-explained configuration are explained as follows.

An SIP registration procedure for an interactive broadcast service according to the present invention is explained in the following description.

First of all, the UE 10 subscribes in a service provided by the AS 50 and the CSCF 40 which are interacting with each other.

The UE 10 transmits an SIP message by inserting subscription-related information according to the subscription into an SDP part of the SIP message.

If so, the HSS 61 registers the subscription-related information to the database 62. In this case, the CSCF 40 receives the SIP message containing the subscription-related information and then handles the SIP registration for the UE 10 by interacting with the HSS 61.

The CSCF 40 receives information for a fringe area, where reception is poor, according to various areas of the broadcast service from the MRFC 30.

Subsequently, the HSS 61 stores the received information for the fringe area in the database 62 as well.

A procedure for providing an interactive broadcast service via IMS after completion of the service subscription of the UE 10 is explained with reference to FIG. 2 as follows.

Figure 2:
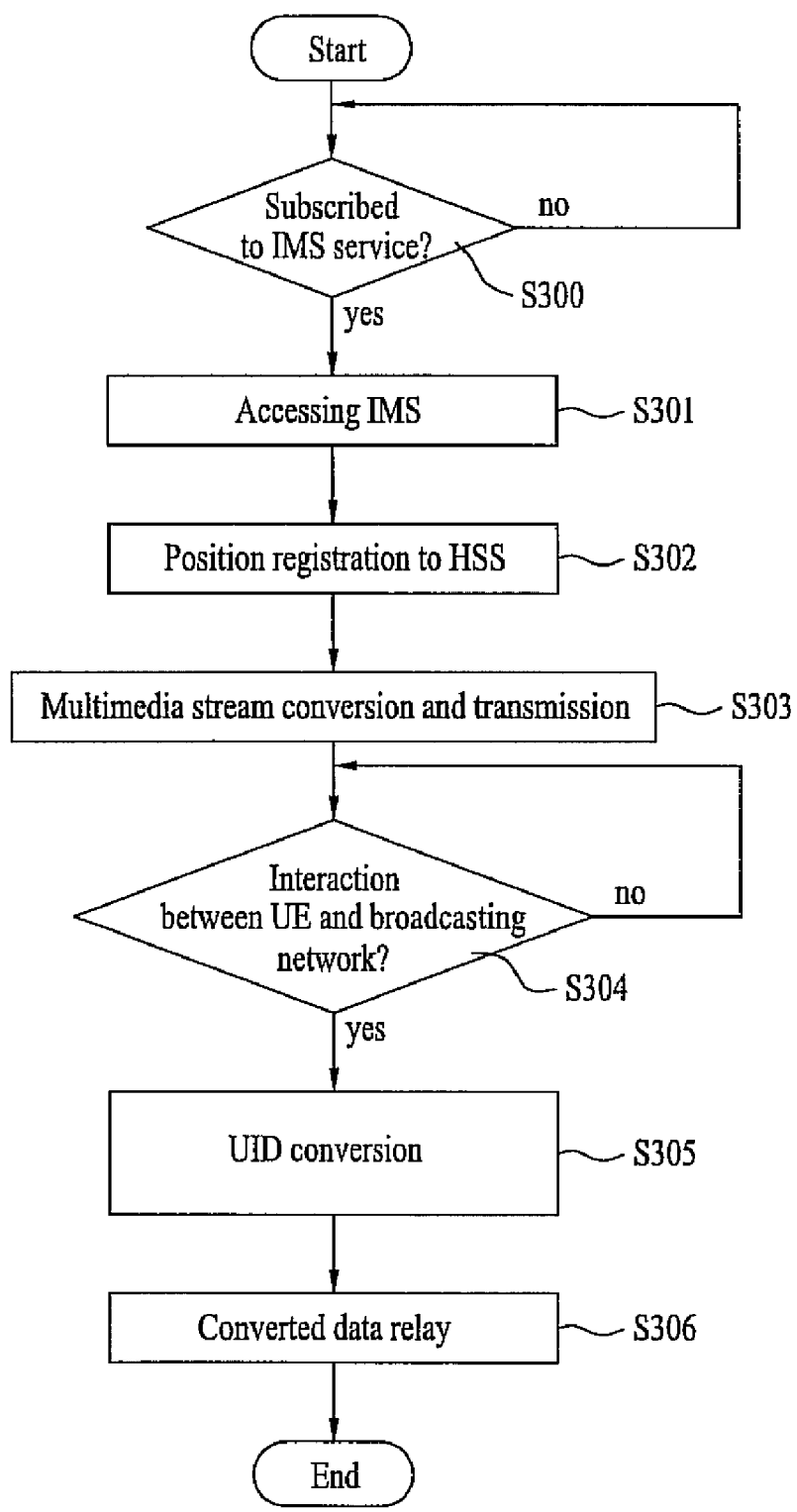
FIG. 2 is a flowchart of a method of supporting an interactive broadcast service via IMS according to one embodiment of the present invention.

FIG. 2 is a flowchart of a method of supporting an interactive broadcast service via IMS according to one embodiment of the present invention.

Referring to FIG. 2, the UE 10 transmits an SIP message to an IMS side to make a call setup and a service request for receiving a broadcast service. In this case, corresponding subscription-related information is inserted in a SDP part of the SIP message.

The MRFC 30 is provided with subscription-related information including position information, performance and specification information of the UE 10 from the HSS 61 via the CSCF 40 according to the service request made by the UE 10.

The MRFC 30 decides whether the UE 10 is in a valid subscription status of an IMS service based on the information provided by the HSS 61 (S300).

If the UE is not subscribed in the IMS service, a new registration or an update of the subscription-related information is carried out.

If the UE 10 is a valid subscriber, the UE 10 is connected to the IMS side (S301).

Since current position information of the UE 10 is included in the subscription-related information received from the UE 10, a current position of the UE 10 is registered to the HSS 61 (S302).

The transcoder of the MRFC 30 converts a multimedia stream received from the broadcasting network 70 to a format corresponding to the performance and specification of the UE 10 according to the broadcast service provision. When the MRFC 30 converts the multimedia stream, the subscription-related information provided by the HSS 61 is referred to. And, the MRFC 30 transmits a result of the conversion to the UE 10 (S303).

In providing the broadcast service via the above format conversion, the MRFC 30 checks whether a relay of UID is requested between the UE 10 and the broadcasting network 70 (S304).

If the UID relay is requested, the MRFC 30 performs a format conversion of user interaction data (UID) by controlling a PUID entity of the MRFP 20 (S305).

In particular, the PUID entity converts the UID (user interaction data) delivered from the UE 10 to a signal format suitable for the broadcasting network 70. If so, the MRFP 20 transmits a result of the conversion to the broadcasting network 70. In doing so, the UE 10 transmits the UID via SDP of the SID message. The signal format converted from the UID depends on the provided service type. In other words, because the UID from the UE 10 is transmitted to a different network depending on the provided service type, the PUID entity converts the UID to a signal format suitable for the network depending on the provided service type. For example, the UID from the UE is transmitted to the one of the above broadcasting network 70, a network based on IP, PSTN, etc.

And, the PUID entity converts the UID delivered from the broadcasting network 70, i.e., supplementary information except a multimedia stream to a signal format suitable for the UE 10. If so, the MRFP 20 transmits a result of the conversion to the UE 10. In doing so, the MRFP 20 transmits the result of the conversion to the UE 10 via SDP of the SID message.

Namely, the MRFP 20 relays the data converted by the PUID entity between the UE 10 and the broadcasting network 70 (S306).

Alternatively, the transcoder is provided to the MRFP 20 to consider converting a multimedia stream received from the broadcasting network to a format corresponding to the performance and specification of the UE under the control of the MRFC 30.

Accordingly, the present invention provides the following effect or advantage.

First of all, the present invention defines a new interface between a broadcasting network and an MRFP for the convergence between an IMS and the broadcasting network and a new entity for a signal format conversion, thereby providing various broadcast services of terrestrial, DMB, cable, satellite TV and the like as well as a conventional IMS service to a user having subscribed in the IMS.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for providing an interactive broadcast service based on an Internet protocol (IP), the method comprising:
   registering a user equipment to a multimedia subsystem using a protocol for initiating an interactive user session that involves multimedia elements, the registration including registering performance and specification information of the user equipment;
   determining whether the user equipment is in a valid subscription status of the multimedia subsystem when the interactive broadcast service is requested;
   connecting the user equipment to the multimedia subsystem if it is determined that the user equipment is in the valid subscription status;
   determining whether the user equipment is in a fringe area of a broadcast service using current position information of the user equipment and fringe area information of the broadcast service;
   converting a multimedia stream received from a broadcasting network to a format corresponding to the performance and specification information of the user equipment if it is determined that the user equipment is in the fringe area of the broadcast service;
   providing the converted multimedia stream to the user equipment;
   determining whether a request for a relay of interaction data between the user equipment and the broadcasting network has been made;
   receiving first interaction data from the user equipment;
   receiving second interaction data from the broadcasting network, the second interaction data comprising supplementary information other than the multimedia stream;
   converting the first interaction data received from the user equipment to a first signal format supported by the broadcasting network if it is determined that the request for the relay of the interaction data has been made, determining a forwarding route for the converted first interaction data via a server by referring to a service profile, and relaying the converted first interaction data in the first signal format to the broadcasting network according to the determined forwarding route;
   converting the second interaction data received from the broadcasting network to a second signal format supported by the user equipment if it is determined that the request for the relay of the interaction data has been made and relaying the converted second interaction data in the second signal format to the user equipment; and
   either updating the registered performance and specification information or repeating registration of the user equipment if it is determined that the user equipment is not in the valid subscription status.

2. The method of claim 1, wherein the protocol is a protocol for controlling the signaling of a communication session with the multimedia subsystem and the user equipment registers with the multimedia subsystem by inserting subscription-related information of the user equipment into a portion of a message defined by the protocol and transmitted to the multimedia subsystem.

3. The method of claim 2, wherein the portion of the message into which the subscription-related information is inserted is based on a session description protocol representing features of the communication session.

4. The method of claim 2, wherein the subscription-related information comprises identification of the user equipment, the performance and specification information of the user equipment, current position of the user equipment, information associated with authentication or service approval of the user equipment or routing information of the user equipment.

5. The method of claim 2, wherein the first interaction data received from the user equipment is received by inserting the first interaction data into a portion of the message, wherein the portion of the message into which the first interaction data is inserted is based on a session description protocol representing features of the communication session.

6. The method of claim 2, wherein the converted second interaction data in the second signal format is transmitted by inserting the converted second interaction data in the second signal format into a portion of the message, the portion of the message based on a session description protocol representing features of the communication session.

7. A system for providing an interactive broadcast service to user equipment, comprising:
   a first server configured to
      receive a message of a protocol from the user equipment, and
      register a service subscription for the user equipment based on subscription-related information included in the message;
   a first media server configured to:
      receive a multimedia stream from a broadcasting network to be transmitted to the registered user equipment,
      convert the received multimedia stream to a format corresponding to performance and specification information of the user equipment, and
      provide the converted multimedia stream to the user equipment; and
   a second media server connected to the broadcasting network, the second media server configured to:
      determine whether a request for a relay of interaction data between the user equipment and the broadcasting network has been made,
      receive first interaction data inserted in the message from the user equipment,
      receive second interaction data including supplementary information other than the multimedia stream from the broadcasting network,
      convert the first interaction data inserted in the message to a signal format supported by the broadcasting network if it is determined that the request for the relay of the interaction data has been made, determine a forwarding route for the converted first interaction data by referring to a service profile, transmit the first converted interaction data received from the user equipment to the broadcasting network according to the determined forwarding route, convert the second interaction data received from the broadcasting network to a signal format supported by the user equipment if it is determined that the request for the relay of the interaction data has been made, and transmit the converted second interaction data received from the broadcasting network to the user equipment, wherein the first server is further configured to determine whether the user equipment is in a valid subscription status when the interactive broadcast service is requested, connect with the user equipment if it is determined that the user equipment is in the valid subscription status, and repeat the registration if it is determined that the user equipment is not in the valid subscription status, and wherein the first media server is further configured to convert the received multimedia stream if it is determined the user equipment is in a fringe area of a broadcast.

8. The system of claim 7, wherein the system is an Internet protocol (IP) multimedia subsystem configured to provide a communication service based on the IP.

9. The system of claim 7, wherein the first server includes a home subscriber server to register the subscription-related information on a database, the subscription-related information including identification information of the user equipment, the performance information of the user equipment and the specification information of the user equipment, current position information of the user equipment, information associated with authentication or service approval of the user equipment and routing information of the user equipment.

10. The system of claim 7, wherein the first media server comprises a multimedia resource function controller having a transcoder to convert the multimedia stream.

11. The system of claim 7, wherein the second media server comprises a multimedia resource function processor having an entity for converting the first interaction data received from user equipment and for converting the second interaction data received from the broadcasting network.

12. The system of claim 7, wherein the first media server is further configured to control the second media server using an H.248 interface.

13. The system of claim 7, wherein the first server is further configured to provide the first media server with the performance and specification information of the user equipment from the subscription-related information of the user equipment subscribed to the first server.

14. The system of claim 8, wherein a session initiation protocol is established between the first server and the user equipment, and the first server is further configured to receive a message of the established session initiation protocol from the user equipment.

* * * * *